(12) United States Patent
Fischer et al.

(10) Patent No.: US 9,625,343 B2
(45) Date of Patent: Apr. 18, 2017

(54) METHOD AND APPARATUS FOR RECOGNIZING KNOCKING OF AN INTERNAL COMBUSTION ENGINE, PREFERABLY OF A GASOLINE ENGINE

(71) Applicant: Robert Bosch GmbH, Stuttgart (DE)

(72) Inventors: Wolfgang Fischer, Gerlingen (DE); Franz Raichle, Korntal-Muenchingen (DE); Walter Lindermeir, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 14/526,206

(22) Filed: Oct. 28, 2014

(65) Prior Publication Data

US 2015/0114088 A1 Apr. 30, 2015

(30) Foreign Application Priority Data

Oct. 29, 2013 (DE) .......................... 10 2013 221 993

(51) Int. Cl.
*G01L 23/22* (2006.01)
*G01H 17/00* (2006.01)

(52) U.S. Cl.
CPC ........... *G01L 23/221* (2013.01); *G01H 17/00* (2013.01)

(58) Field of Classification Search
CPC .............................. G01H 17/00; G01L 23/221
USPC ....................................................... 73/35.01
See application file for complete search history.

(56) References Cited

U.S. PATENT DOCUMENTS

| 6,408,819 | B1 * | 6/2002 | Mezger | F02D 35/024 123/406.29 |
| 6,923,046 | B2 * | 8/2005 | von Glowczewski | G01M 15/08 73/114.16 |
| 7,295,916 | B2 * | 11/2007 | Sauler | G01L 23/225 701/111 |
| 7,424,820 | B2 * | 9/2008 | Iwade | G01L 23/225 123/406.38 |
| 7,945,379 | B2 * | 5/2011 | Kaneko | G01L 23/225 123/406.34 |
| 8,342,011 | B2 * | 1/2013 | Galtier | F02D 41/1497 73/114.16 |
| 8,429,955 | B2 * | 4/2013 | Taglialatela Scafati | G01M 15/11 73/114.16 |
| 8,474,308 | B2 * | 7/2013 | Sgatti | F02D 35/027 73/114.07 |
| 9,477,895 | B2 * | 10/2016 | Hershey | G06K 9/00973 |

* cited by examiner

*Primary Examiner* — Freddie Kirkland, III
(74) *Attorney, Agent, or Firm* — Gerard Messina

(57) ABSTRACT

In a method for recognizing knocking of an internal combustion engine, solid-borne sound signals are measured and solid-borne sound features are recovered from the measured sound signals. A peak pressure for a combustion event of the internal combustion engine is estimated from the solid-borne sound features, and the estimated peak pressure is compared with a knock recognition threshold, knocking of the internal combustion engine being recognized when the knock recognition threshold is exceeded by the estimated peak pressure.

14 Claims, 4 Drawing Sheets

METHOD AND APPARATUS FOR RECOGNIZING KNOCKING OF AN INTERNAL COMBUSTION ENGINE, PREFERABLY OF A GASOLINE ENGINE

BACKGROUND OF THE INVENTION

1. Field of the Invention

The present invention relates to a method for recognizing knocking of an internal combustion engine, preferably of a gasoline engine, in which solid-borne sound signals are measured and solid-borne sound features are recovered from them; and to an apparatus for carrying out the method.

2. Description of the Related Art

In gasoline engines it is usual to detect knocking by way of a knock sensor. This knock sensor is disposed on the gasoline engine and recognizes solid-borne sound vibrations of the gasoline engine that occur as a result of explosion-like combustion events inside the cylinder of the gasoline engine. These explosion-like combustion events occurring inside the combustion chamber of the gasoline engine are converted into vibrations that are conveyed to the walls of the internal combustion engine and are perceived there as solid-borne sound. Excessive vibration can result in damage to the gasoline engine and must therefore be suppressed.

For knock recognition, the solid-borne sound signal supplied from the solid-borne sound sensor is in essence filtered, rectified, and integrated in a suitable measurement window. Based on the final integral value, a relative solid-borne sound feature is then calculated, and with this a knock decision is arrived at by way of a threshold value comparison.

Interference is increasingly presenting problems with this type of knock recognition. In order to improve knock recognition, the possibility exists of calculating a time/frequency representation in the measurement window, with the result that a plurality of solid-borne sound features for a combustion event are ascertained. It is still unclear, however, how classification in a high-dimensional space is to be accomplished based on such a plurality of solid-borne sound features. There are known methods, such as support vector classification (SVC), with which a classification in high-dimensional space can occur. This method is not optimal for knock recognition, however, since only digital decisions can ever be made here, whereas the knock intensity represents a continuous signal. Support vector regression (SVR) is also known, but this has the disadvantage, at least in the standard application, that the weighting of individual elements is always the same.

BRIEF SUMMARY OF THE INVENTION

The object on which the invention is based is therefore that of describing a method for recognizing knocking of an internal combustion engine of a motor vehicle, with which a classification as to knocking is accomplished based on many solid-borne sound features characterizing the combustion event, in order thereby to ensure accurate knock recognition.

The object is achieved according to the present invention in that an absolute peak pressure for a combustion event of the internal combustion engine is estimated from the solid-borne sound features, and the estimated absolute peak pressure is compared with a knock recognition threshold, knocking of the internal combustion engine being recognized when the knock recognition threshold is exceeded by the estimated peak pressure. This has the advantage that a classification of knocking and non-knocking combustion events is possible, since the absolute peak pressure calculated from the measured solid-borne sound features, which is preferably obtained from a bandpass-filtered combustion chamber pressure signal (typically 4 to 40 kHz), represents a reference for the knock intensity.

Advantageously, the solid-borne sound signals are measured during a measurement window extending within a combustion event, a plurality of solid-borne sound features being determined therefrom. From evaluation of a large number of solid-borne sound features it is possible to make an accurate statement as to whether or not knocking is present in the gasoline engine.

In an embodiment, the solid-borne sound features are ascertained from the solid-borne sound signals by way of a Fourier transformation. The measured solid-borne sound values can thereby be processed in a simple software-based procedure, and conclusions can be drawn therefrom as to the absolute peak pressure of each combustion event.

In an embodiment, the high-frequency solid-borne sound features are made up of energies of various frequencies of a power density spectrum of the combustion event, allowing a plethora of energy features to be determined by Fourier transformation.

Advantageously, the solid-borne sound features are each weighted. By weighting and subsequent summation, the numerous solid-borne sound features are mapped onto the peak pressure by a regression calculation. Using the threshold value comparison in terms of the peak pressure thereby identified, it is then possible to decide as to whether or not knocking of the gasoline engine is present.

In an embodiment, for weighting, in an application operation a weighting factor and/or an offset for the solid-borne sound features are ascertained using a combustion chamber pressure measured during a combustion event in a cylinder of the internal combustion engine. The combustion chamber pressure is measured at different operating points, each operating point being characterized by a predefined load and a predefined rotation speed. Typically 1000 to 3000 combustion events are evaluated for each operating point, in order to ensure that a suitable number of knocking combustion events is present within these evaluated combustion events.

In a variant, an absolute peak pressure is calculated from the combustion chamber pressure using the solid-borne sound features ascertained in the same combustion event, said pressure being subtracted from the solid-borne sound features ascertained during the application operation; and a weighting of the difference vector thereby obtained is accomplished in such a way that the strong non-knocking combustion events and/or the weak knocking combustion events receive a higher weight among the solid-borne sound features identified during the application operation. The equation system used during this application operation is one that is redundant because of the many combustion events that are available as unknowns.

In an embodiment, in the context of weighting of the combustion event in the optimization task, a maximum weight occurs where the strong non-knocking combustion events and the weak knocking combustion events adjoin one another, a monotonically decreasing weighting being constituted on both sides proceeding from the maximum. Weighting is performed in such a way that the solution to the optimization problem is essentially not identified only by way of the many combustion events having low peak pressures, but instead the combustion events are competent participants in the regions in which strong non-knocking combustion events and weak knocking combustion events occur, the result being a good classification.

Advantageously, the weighting transitions to saturation for very small and very large peak pressures. An improved correlation is thereby achieved between the peak pressure and the weighting, preferably in the region between the large and small peak pressures.

In an embodiment, the application weighting is iteratively adapted during the application operation. This allows the statistics of the distribution of the solid-borne sound features to be taken into account.

In addition, the solid-borne sound features are subjected to a nonlinear transformation prior to weighting with the weighting factor. Because the absolute peak pressure is to be identified from a linear dependence on solid-borne sound features, a nonlinear transformation of this kind results in better establishment of said linear dependence.

In a variant, the knock recognition threshold is adapted as a function of absolute peak pressures estimated in preceding combustion events. This has the advantage that aging effects in the gasoline engine, in the context of which the baseline noise of the gasoline engine changes, are incorporated into the knock recognition threshold, and incorrect knock recognition decisions are thereby avoided.

A refinement of the invention relates to an apparatus for recognizing knocking of an internal combustion engine, preferably of a gasoline engine, which receives signals of a solid-borne sound sensor and ascertains solid-borne sound features from the signal of the solid-borne sound sensor. In an apparatus that permits reliable identification of a knock event even when numerous solid-borne sound features are present, means are present which estimate, from the solid-borne sound features, a peak pressure for a combustion event of the internal combustion engine and compare the estimated peak pressure with a knock recognition threshold, knocking of the internal combustion engine being recognized when the knock recognition threshold is exceeded by the estimated peak pressure. This has the advantage that a classification into knocking and non-knocking combustion events is possible, since the high-frequency maximum absolute peak pressure, representing a reference, is estimated from the solid-borne sound signals.

Advantageously, the means for estimating the peak pressure detect the signals of the solid-borne sound sensor emitted during a combustion event in a measurement window extending during the combustion event, and identify therefrom a plurality of solid-borne sound features that are weighted. The numerous solid-borne sound features that are taken from the signal of the solid-borne sound sensor are mapped by way of a regression calculation onto a peak pressure; it is then possible to decide, by way of a comparison with the knock recognition threshold, whether knocking of the gasoline engine exists.

DETAILED DESCRIPTION OF THE INVENTION

Figure 1:
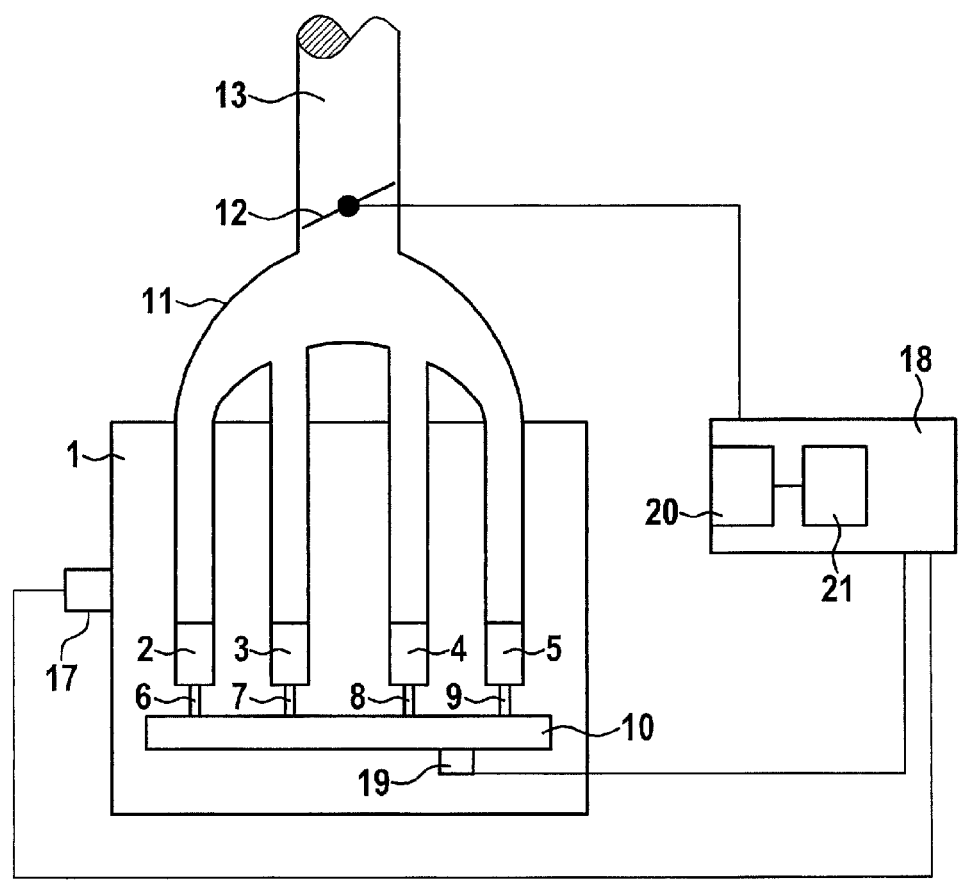
FIG. 1 shows an apparatus for sensing knock signals in an internal combustion engine.

Identical features are labeled with identical reference characters.

Figure 2:
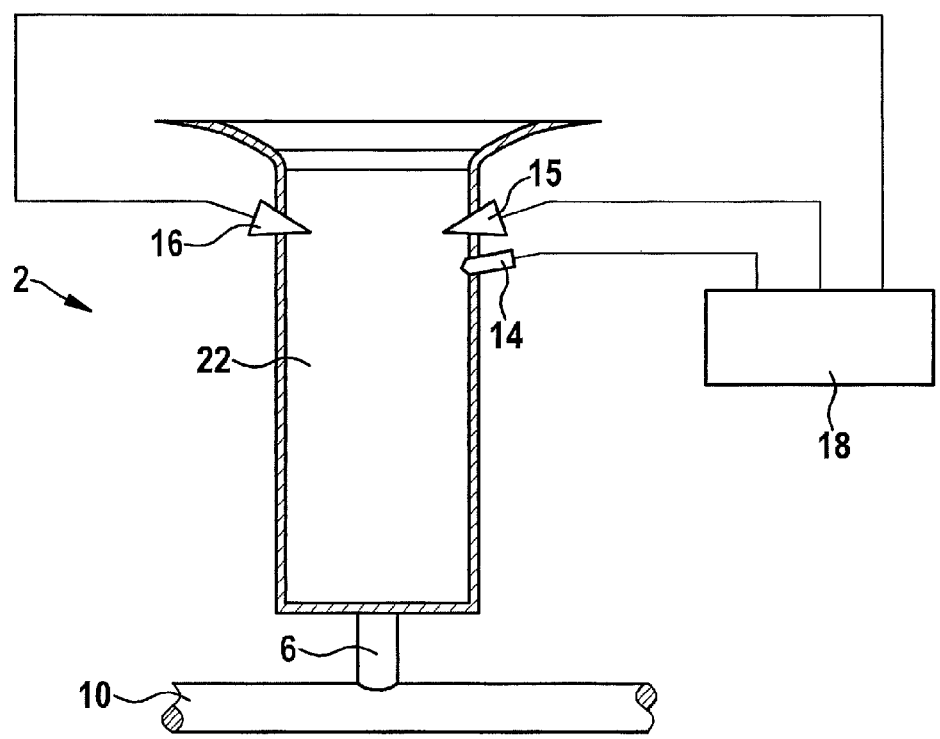
FIG. 2 shows an exemplifying embodiment of a cylinder of the internal combustion engine according to FIG. 1.

FIG. 1 shows an apparatus for sensing knock signals in an internal combustion engine that is preferably embodied as a gasoline engine. In this example, internal combustion engine 1 has four cylinders 2, 3, 4, 5 whose pistons (not depicted further), which move in cylinders 2, 3, 4, 5, are each connected via a connecting rod 6, 7, 8, 9 to crankshaft 10 and drive it as a result of the changes in pressure caused by combustion. Cylinders 2, 3, 4, 5 are connected to an intake manifold 11 that is closed off by a throttle valve 12 with respect to an air intake duct 13. Projecting into each cylinder 2, 3, 4, 5 is a nozzle 14 for the injection of fuel and an intake valve 15 for fresh air, the result being that a fuel-air mixture forms in cylinders 2, 3, 4, 5. In addition, each cylinder 2, 3, 4, 5 has an exhaust valve 16 for the exhaust gases that are produced during the combustion processes, as depicted in FIG. 2 by way of example only for cylinder 2. Disposed on internal combustion engine 1 is a solid-borne sound sensor 17 that detects the solid-borne sound vibrations caused by the combustion events and transferred to internal combustion engine 1. The signals of solid-borne sound sensor 17 are conveyed to a control unit 18 that is also connected to a crankshaft sensor 19 located opposite the crankshaft; control unit 18 associates the combustion events with the signal of crankshaft sensor 19 which represents a crankshaft angle. Control unit 18 encompasses a microprocessor 20 that is connected to a memory 21.

In internal combustion engine 1, combustion of the delivered fuel-air mixture causes a vehicle equipped with internal combustion engine 1 to be shifted into driving operation, or causes driving operation to be maintained. Combustion of the fuel-air mixture is initiated by an ignition spark of a spark plug. The ignition spark establishes a flame front that propagates in the entire combustion chamber 22 of the respective cylinder 2, 3, 4, 5 of the internal combustion engine and, during combustion, converts the fuel-air mixture that is present into kinetic energy. In the case of knocking combustion events, some of the combustion events occur abruptly and cause in combustion chamber 22 of internal combustion engine 1 a sharp rise in pressure, which generates a pressure wave that propagates and strikes the walls delimiting combustion chamber 22, where the high-frequency vibrations are converted into solid-borne sound. These vibrations are detected by solid-borne sound sensor 17. Control unit 18 evaluates these continuous vibrations, this being taken into account in the context of the control of internal combustion engine 1 by control unit 18 during knock regulation, in order to avoid engine damage.

From the solid-borne sound features obtained from solid-borne sound sensor 17, control unit 18 estimates an absolute peak pressure $p_i$ for each combustion event i, said pressure being evaluated for knock recognition. Stored in memory 21 of control unit 18 is a formula which represents a linear relationship and according to which microprocessor 20 identifies the estimated value of the absolute peak pressure $p_i$ from the solid-borne sound signal for each combustion event i:

$$p_i = m_i^T * w_i + b \tag{1}$$

The vector $m_i$ contains the solid-borne sound features, for example energies, obtained from the solid-borne sound signal by way of a Fourier transformation, these being made up of a power density spectrum due to various frequencies. w is a vector with which the solid-borne sound features $m_i$ are weighted and which, after the addition of constant b, yield an estimate of the peak pressure $p_i$ of the combustion event i. Proceeding from this, the peak pressure $p_i$ is compared with a knock recognition threshold, a decision as to knocking being made when the knock recognition threshold is exceeded by the estimated peak pressure $p_i$.

The vector w and constant b are identified in an application operation and are stored in control unit 18 prior to actual measurement by solid-borne sound sensor 17 and evaluation of the solid-borne sound features $m_i$ by control unit 18.

During the application operation, the system of equations recited in equation (1) is redundant because many combustion events i are available as unknowns. What must be dealt with is therefore an optimization problem in which a weighting of the combustion events i must be performed so that the relevant combustion events, i.e. the strong non-knocking combustion events i and the weak knocking combustion events i, acquire a higher weight upon optimization than the remaining combustion events. The procedure here is as follows:

In the application operation, different operating points that are characterized by load and rotation speed are visited. Typically 1000 to 3000 combustion events are used for each operating point, it being assumed that a suitable number of knocking combustion events exist within this large number. In the application operation, the combustion chamber pressure $p_{ref}$ during a combustion event i is measured using a combustion chamber pressure sensor, and a plurality of solid-borne sound features $m_i$ are determined from the solid-borne sound signals occurring during the same combustion event i:

$p_{ref} = [p_1 \ldots p_n]^T$    combustion chamber pressure measured during the application operation, $$M = \begin{vmatrix} 1 & m_1^T \\ 1 & m_2^T \\ \vdots & \vdots \\ \vdots & \vdots \\ \vdots & \vdots \\ 1 & m_n^T \end{vmatrix}$$    feature vector of the solid-borne sound features $x = [b_w, w^T]^T$ g    weighting $p_{ref}$, M, and x are defined as follows:

$$\bar{r} = \text{diag}(\sqrt{g_1} \ldots \sqrt{g_n})(Mx - p_{ref}) \quad (2)$$

$\min_x \|\bar{r}\|_2^2$ where $\|\bar{r}\|_2^2 = \|r\|_G^2 = r^T G r$ where $G = \text{diag}(g_1 \ldots g_n)$.

Figure 3:
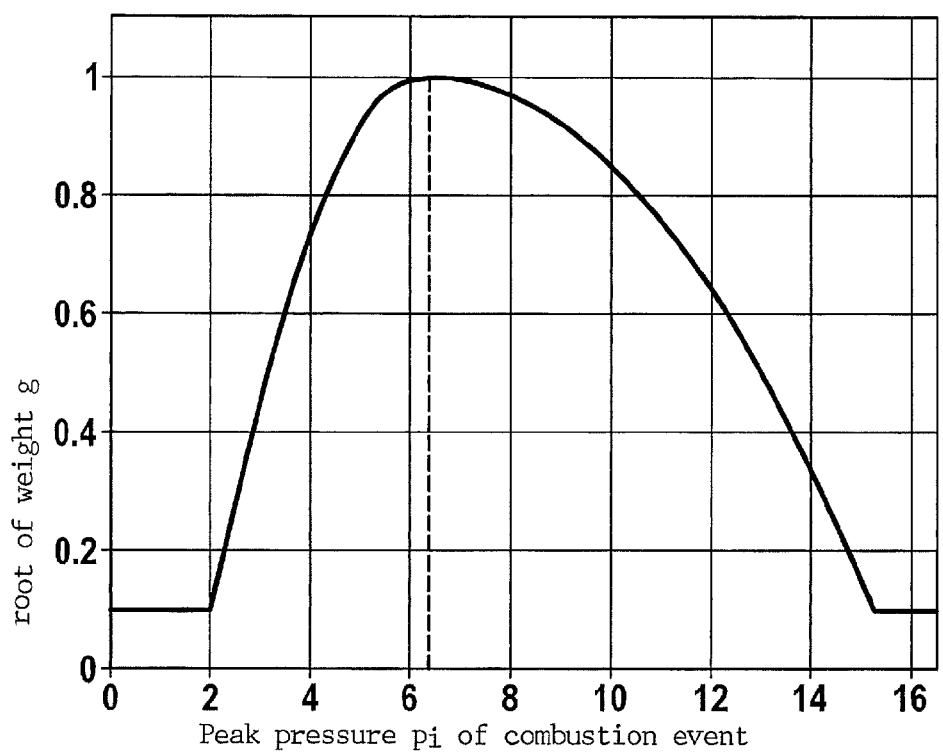
FIG. 3 shows an exemplifying embodiment of application weighting of the peak pressure.
Figure 4:
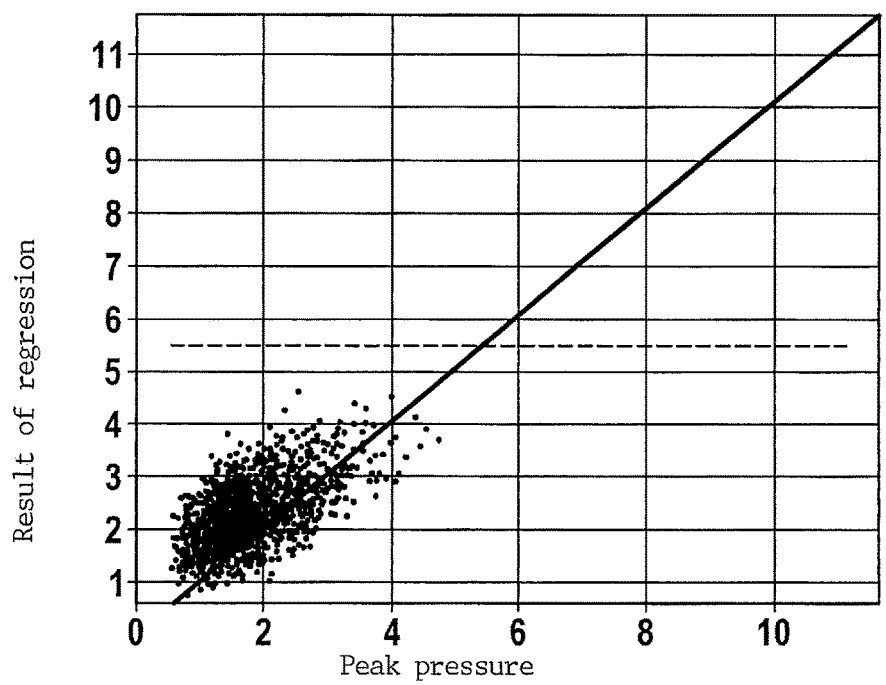
FIG. 4 shows correlation of the result of the weighted regression calculation with the absolute peak pressure that was ascertained according to an exemplifying embodiment of the method according to the present invention.
Figure 5:
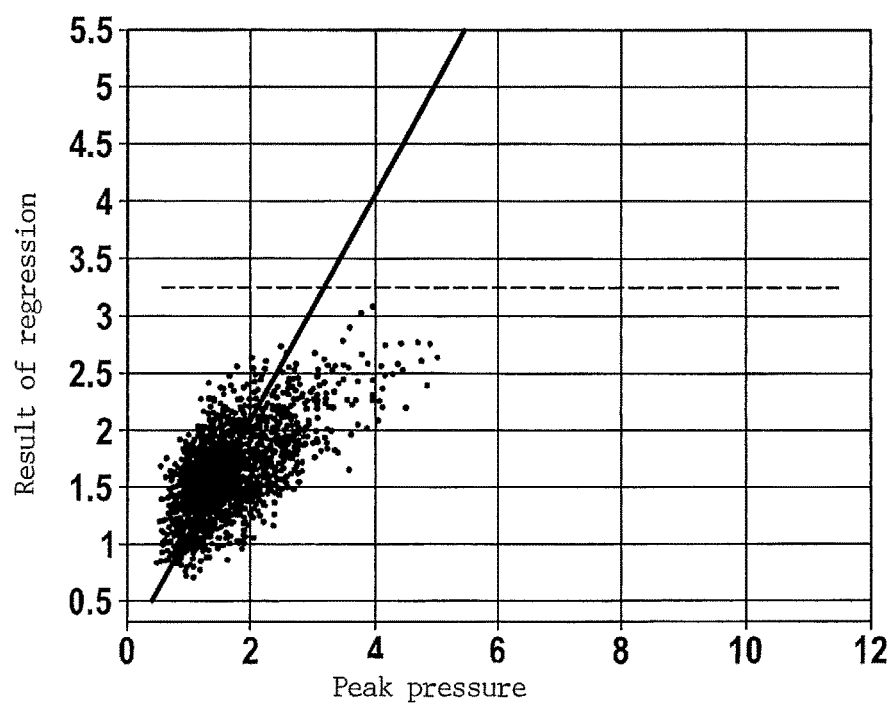
FIG. 5 shows correlation of the result of support vector regression (SVR) with the peak pressure, in accordance with the existing art.

FIG. 3 depicts a possible weighting $\sqrt{g_n}$ of the combustion events i as a function of peak pressure $p_i$. A maximum weight is located where the separation between strong non-knocking combustion events i and weak knocking combustion events i is present. For example, in the present example the separation occurs at an absolute peak pressure of 6.3 bar for the bandpass-filtered combustion chamber pressure, at a rotation speed of 6300 rpm. For very small and very large peak pressures $p_i$ the weighting is then intended to transition into a saturation that is greater than zero. In between, a monotonically decreasing weighting proceeding from the maximum on both sides is provided. This weighting $\sqrt{g_n}$ is iteratively adapted during the application operation in order to satisfy the statistics of the distribution of solid-borne sound features $m_i$ in the application operation. Before the solid-borne sound features $m_i$ are processed in equation (1), they are subjected to a nonlinear transformation. This can be done, for example, by converting the solid-borne sound features $m_1$ to logarithms. FIG. 4 shows the correlation between the regression results and the peak pressure that was weighted using the regression calculation provided for. In the region where, as desired, good classification is to occur, a good correlation exists here for strong non-knocking combustion events i and weak knocking combustion events i, thereby enabling a reliable knocking decision. For comparison with this, a correlation using support vector regression (SVR), in which all the solid-borne sound features $m_i$ are weighted identically, is carried out in FIG. 5. The result of this is that the many combustion events i having low peak pressures influence the classification and thus result in distortion.

The baseline noise of gasoline engine 1 can change as a result of aging effects. The knock recognition threshold for the current combustion event is therefore adapted as a function of the already calculated peak pressures p of the preceding combustion events, which are stored in memory 21. Alternatively, the current peak pressure $p_i$ can also be referred to an average of the preceding combustion events $p_i$,s, and the applied knock recognition threshold can then be worked with.

What is claimed is:

1. A method for recognizing knocking of an internal combustion engine, comprising:
   measuring at least one solid-borne sound signal;
   obtaining at least one solid-borne sound feature from the measured solid-borne sound signal;
   estimating a peak pressure for a combustion event of the internal combustion engine from the solid-borne sound feature;
   comparing the estimated peak pressure with a knock recognition threshold; and
   recognizing a knocking of the internal combustion engine when the knock recognition threshold is exceeded by the estimated peak pressure.

2. The method as recited in claim 1, wherein multiple solid-borne sound signals are detected during a measurement window extending within the combustion event, and wherein multiple solid-borne sound features are determined from the measured solid-borne sound signals.

3. The method as recited in claim 2, wherein the solid-borne sound features are ascertained from the solid-borne sound signals by way of a Fourier transformation.

4. The method as recited in claim 3, wherein the solid-borne sound features are made up of energies of various frequencies of a power density spectrum of the combustion event.

5. The method as recited in claim 3, wherein the solid-borne sound features are each weighted.

6. The method as recited in claim 5, wherein for the weighting, in an application operation at least one of a weighting factor and an offset for the solid-borne sound features is ascertained using a combustion chamber pressure measured during the combustion event in a cylinder of the internal combustion engine.

7. The method as recited in claim 6, wherein an absolute peak pressure is calculated from the combustion chamber pressure using the solid-borne sound features ascertained in the same combustion event, the combustion chamber pressure being subtracted from the solid-borne sound features ascertained during the application operation to obtain a difference vector, and weighting of the difference vector is accomplished in such a way that at least one of strong non-knocking combustion events and weak knocking combustion events receive a higher weight among the solid-borne sound features identified during the application operation.

8. The method as recited in claim 7, wherein the weighting of the combustion event in the optimization task assumes a maximum weight where the strong non-knocking combustion events and the weak knocking combustion events adjoin one another, and a monotonically decreasing weighting is assigned on both sides proceeding from the maximum.

9. The method as recited in claim 8, wherein the weighting transitions to saturation for very small and very large peak pressures calculated from the combustion chamber pressures.

10. The method as recited in claim 6, wherein the weighting is iteratively adapted during the application operation.

11. The method as recited in claim 6, wherein the solid-borne sound features are subjected to a nonlinear transformation prior to weighting with the weighting factor.

12. The method as recited in claim 6, wherein the knock recognition threshold is adapted as a function of absolute peak pressures estimated in preceding combustion events.

13. An apparatus for recognizing knocking of an internal combustion engine, comprising:
a control unit including a processor configured to:
receive at least one signal of a solid-borne sound sensor;
ascertain at least one solid-borne sound feature from the signal of the solid-borne sound sensor;
estimate a peak pressure for a combustion event of the internal combustion engine from the solid-borne sound feature;
compare the estimated peak pressure with a knock recognition threshold; and
recognize a knocking of the internal combustion engine when the knock recognition threshold is exceeded by the estimated peak pressure.

14. The apparatus as recited in claim 13, wherein the signal of the solid-borne sound sensor emitted during a combustion event is detected in a measurement window extending during the combustion event, and multiple solid-borne sound features are identified and weighted.

* * * * *